3,265,771
POLYPROPYLENE-POLYETHYLENE BLENDS
Richard Louia Ray, Leon Walter Gamble, and Earl Boue Claiborne, Baton Rouge, La., and George M. Coats, Berkeley Heights, N.J., assignors to Esso Research and Engineering Company, a corporation of Delaware
No Drawing. Filed Feb. 13, 1961, Ser. No. 88,650
The portion of the term of the patent subsequent to Aug. 20, 1982, has been disclaimed
7 Claims. (Cl. 260—897)

The present invention deals with improving the low temperature and impact resistance properties of polypropylene. More particularly, it deals with substantially improving the properties of low pressure, isotactic polypropylene by blending the polypropylene with polyethylene characterized by its low degree of branching and high crystallinity.

Recently, so-called "low pressure" polypropylene has been assuming increasing importance as a plastic material for various uses. This polymer has been prepared by the now well-known process of polymerizing propylene with a catalyst system made up of a reducible, heavy transition metal halide and a reducing, metal-containing compound to yield a high density, isotactic, high molecular weight, solid, relatively linear polymer product. However, one of the difficulties in applying such "low pressure" polypropylene plastics, particularly as a packaging material for frozen foods, wire and cable insulation, plastic pipes and bottles, etc., has been their excessive brittleness at low temperatures. Quite obviously, a plastic which is extremely sensitive to shock or impact at reduced temperatures is impracticable for various applications.

It has been proposed to add polyethylene to polypropylene to improve these properties. Recently it has been suggested that minor quantities of polyethylene prepared by the low pressure Ziegler catalyst system could be blended with polypropylene to improve the latter's properties. While some improvement has been obtained by these means, neither polyethylene prepared by high pressure catalyst systems such as the commonly called Peroxide Catalyst Process which employs catalysts such as persulfates, dialkyl peroxides, azo compounds, etc., as disclosed in an article in "Industrial and Engineering Chemistry," vol. 49, page 1071, nor polyethylene prepared as described in "Scientific American," September 1957, pages 98 et seq., i.e., a catalyst prepared by simply mixing a reducible heavy transition metal halide and an alkyl aluminum compound, has been found to give sufficient improvement in the low temperature properties of polypropylene to meet the demands of commercial acceptance.

It has now been found that a specific type of polyethylene having properties differentiating it from polyethylene produced by either the conventional Ziegler process or high pressure polymerization will, when compounded with polypropylene, produce a polypropylene composition having greatly improved low temperature properties. More particularly, it has now been found that when low pressure polypropylene is admixed with 10 to 45, preferably 20 to 40, wt. percent of polyethylene characterized by its low degree of branching, i.e., less than 0.1 methyl ($CH_3$) groups per 100 carbon atoms, and high degree of crystallinity, as indicated by a total wt. percent unsaturation (C=C/100 carbon atoms) of less than 0.05, the resulting polypropylene composition has greatly improved impact resistance and Bell brittleness temperature, e.g., less than −25° F. (the latter determined by ASTM Test D–746 and the former by ASTM Test D–256). The polyethylene may have a number average molecular weight of 100,000 to 1,800,000, preferably 300,000 to 1,300,000.

The distinguishing aspects of the polyethylene employed in the present polypropylene-polyethylene blends of the present invention are summarized in the following table.

*Table I*

| | Range | Polyethylene of Present Composition | | Polyethylene Prepared By Conventional Ziegler Catalysts | | High Pressure Polyethylene |
|---|---|---|---|---|---|---|
| | | Broad | Preferred | Broad | Preferred | Broad |
| 1 | Branching ($CH_3$/100 C-Atoms) | 0–0.10 | 0.02–0.07 | 0.11–0.50 | 0.28–0.50 | 0.6–2.0 |
| 2 | Total Unsaturation, weight percent (C=C/100 C-Atoms) | 0.005–0.05 | 0.01–0.02 | 0.06–0.32 | 0.09–0.22 | 0.1–0.3 |
| 3 | Unsaturation Types, Weight Percent: | | | | | |
| | a. Trans Internal | 0 | 0 | 0–0.03 | 0–0.02 | 0–0.02 |
| | b. Vinylidene | 0–0.04 | 0.005–0.01 | 0.005–0.02 | 0.01–0.015 | 0.02–0.20 |
| | c. Terminal | 0–0.04 | 0.005–0.01 | 0.05–0.30 | 0.08–0.20 | 0.01–0.05 |
| 4 | Density (g./cc.) at 25° C | .92–.97 | .95–.96 | .92–.97 | .94–.95 | .900–.935 |

The polyethylene and polypropylene of the present composition may be blended by any of the conventional methods usually employed for blending, such as solution blending, Banbury mixing, extrusion, ball milling, etc. In one embodiment, wet cakes of each of the polymer constituents are placed in a mixing drier in the proportions desired and mixed while drying by heat, vacuum, or other suitable means, to obtain a dried blend of minimum volatiles content.

The unique type of polyethylene employed in the present polypropylene blends is prepared from a novel catalyst system, hereinafter referred to as "preformed" catalyst. The catalyst is prepared by the partial reduction of a Group IV-B, V-B, or VI-B heavy metal halide, such as vanadium tetrachloride, titanium tetrahalide, especially titanium tetrachloride, with aluminum powder in substantially aromatic hydrocarbon diluents at low temperatures and about atmospheric pressure, to form a metal halide, e.g., titanium chloride co-crystallized with aluminum halide, e.g., aluminum chloride, which is then activated with an organo-metallic reducing compound. This catalyst, when used to polymerize ethylene, gives a unique polyethylene product having substantially less branching and a lower degree of unsaturation than if prepared by simply using titanium tetrachloride and aluminum alkyl in admixture as a polymerization catalyst.

A detailed discussion of the preparation of the catalyst for preparing the polyethylene for the present blends may be had by referring to co-assigned Serial No. 766,376, now Patent No. 3,032,513, and 770,128, now abandoned, filed October 10, 1958, and October 28, 1958, respectively.

By way of illustration, the reduction of titanium tetrachloride to crystalline titanium chloride is carried out by forming a slurry of 1 mole of titanium tetrachloride and 0.10 to 0.35 mole of aluminum powder in 0.1 to 30 moles of diluent, and heating the slurry at a temperature in the range of about 80° to 200° C., preferably 100° to 175° C. The crystallinity of the titanium chloride is dependent upon both time and temperature, the more crystalline catalyst component generally being the more useful. The reaction is carried out for a time sufficient to produce substantially complete reaction conversion of the reacted titanium tetrachloride to crystalline titanium chloride co-crystallized with aluminum chloride. The reaction time generally varies from 0.25 to 24 hours, preferably being 1 to 10 hours. In general, the purple form of titanium chloride has been found to be most desirable.

The powdered aluminum metal used in the process is finely-divided, ball milled aluminum powder, the aluminum metal having a particle size generally in the range of 1 to 100 microns.

The diluents used for the reduction are aromatic hydrocarbons having a melting point below about 10° C. Examples thereof are benzene, toluene, xylene, ethyl benzene, chlorobenzene, ortho-dichlorobenzene, and the like. Benzene used at a pressure high enough to allow the reduction to take place above about 110° C. is particularly preferred since this diluent does not form residue during the reduction reaction. Mixtures of aromatic and aliphatic hydrocarbons can sometimes be used.

The crystalline titanium chloride formed is believed to be composed predominantly of $TiCl_3$ containing aluminum chloride co-crystallized in the lattice structure. The exact crystallographic structure of this catalyst is presently unknown, but is surprisingly high and unique polymerization activity is probably due to the co-crystallization of aluminum and titanium chlorides in such manner that the crystal surface becomes electronically different from that of titanium, and that of pure titanium chloride alone. The approximate composition of the titanium chloride co-crystallized with aluminum chloride is $TiCl_3 \cdot 0.33\ AlCl_3$ as indicated by the stoichiometry of the reaction, as well as by the analytical data.

The crystalline titanium chloride co-crystallized with aluminum chloride in the aromatic diluent reaction mixture or in the aromatic diluent used to extract aluminum chloride is present in the finely-divided form. The titanium chloride co-crystallized with aluminum chloride is then isolated from the reaction mixture, such as by filtering, preferably at a temperature close to that of the reduction followed by pebble milling or preferably ball milling when dry to produce a highly active catalyst component. Dry ball milling for 2 to 250, particularly 20 to 200, hours is preferred. The titanium chloride is thereafter slurried in the hydrocarbon diluent used for the polymerization and used in conjunction with an organo-metallic compound as an activator.

The hydrocarbon diluent employed to slurry the ball milled catalyst component may include paraffin hydrocarbon, such as propane, isopentane, white mineral oil, naphthenes, etc. Aromatics, such as benzene, xylene, and the like, are, however, usually preferred.

A large number of organo-metallic compounds can be used to activate the co-crystallized titanium chloride. Among the most valuable are alkyl aluminum compounds, especially trialkyl aluminum compounds such as triethyl aluminum, tripropyl aluminum, triisobutyl aluminum, etc., and dialkyl aluminum compound, especially dialkyl aluminum halides, such as diethyl aluminum chloride, diisopropyl halides, diisobutyl halides, etc. Organo-aluminum compounds having 1 to 2 hydrocarbon radicals, and two or one electron attracting groups, such as hydrocarbon alkoxy, organic nitrogen or sulfur groups, can be used although trialkyl or triaryl aluminum compounds are preferred. Particularly desirable is the combination of aluminum trialkyls, e.g., aluminum triethyl, with titanium chloride co-crystallized with aluminum chloride.

The slurried catalyst, one or more of the activators (the slurried catalyst and activators are described in the preceding four paragraphs), and ethylene are simultaneously contacted in the presence of inert hydrocarbon solvents, such as n-heptane, isopentane, xylene, benzene, or toluene.

The mole ratio of slurry catalyst (co-crystallized titanium chloride and aluminum chloride) to organo-metallic activator generally used ranges from 0.1 to 6.0. More specifically, the best blending grade polymer is generally made using ratios from 1 to 3. Reaction is carried out at 0° to 150° C. at a pressure ranging from 0 to 150 p.s.i.g. The catalyst concentration (titanium component plus activator) in the polymerization zone is preferably in the range of about 0.02 to 0.5% based on total liquid, and the polymer product concentration in the polymerization zone is preferably kept between about 2 to 15 wt. percent based on total contents to permit easy handling of the polymerized mixture. The proper polymer concentration can be obtained by having enough of the inert diluent present or by stopping the polymerization short of 100% conversion. When the desired degree of polymerizaion has been reached, a $C_1$ to $C_8$ alkanol, such as methanol or isopropyl alcohol, desirably in combination with a chelating agent for deashing, such as acetylacetone, is normally added to the reaction mixture for the purposes of dissolving the deactivating catalyst and for precipitating the polymer product from solution. After saturation, the solid polymer may be further washed with alcohol or acid, such as hydrochloric acid, and dried.

As noted previously, polyethylene prepared in accordance with the above procedure is substantially more crystalline and exhibits less branching than polyethylene prepared by the direct reduction of heavy transition metal halides with aluminum alkyls, as described in Belgium Patent 533,362.

The polypropylene constituent of the present blends may be any of the "low pressure" isotactic polypropylenes. They may be prepared in accordance with the procedure described in Belgium Patent 538,782, or by the catalyst system described above for the preparation of polyethylene for blending. Conventional low pressure, e.g., under 500 p.s.i.g., and low temperature, e.g., 0° to 150° C., conditions may be employed. Typically, the polypropylene will have a stereo-isomer distribution as follows: 80 to 100 wt. percent isotactic, 0 to 10 wt. percent stereo-block, and 0 to 10 wt. percent atactic. The polypropylene will have a number average molecular weight ($M_n$) of between about 80,000 to 800,000, preferably 100,000 to 600,000.

The various aspects and modifications of the present invention will be made more clearly apparent by reference to the following description and accompaning examples.

Polyethylene characterized by its low degree of unsaturation and low degree of branching was prepared by the following procedure:

The preformed catalyst used for the preparation of this polymer was prepared as follows:

88 lbs. of titanium tetrachloride, 4 lbs. of atomized aluminum powder, and 50 gals. of benzene were mixed at room temperature and heated to 280° F. for about 7 hours until the resulting slurry exhibited a purple color. The slurry was then filtered and the solid purple titanium chloride-aluminum chloride precipitate was washed 4 to 6 times with benzene, filtered and dried with the aid of nitrogen sweep gas in a two-step process, first at 200° F. to 250° F. and finally for 24 hours at 300° F. to 350° F. The titanium catalyst was then steel ball milled for two to four days. It was thereafter reslurried in xylene.

The polymerization of ethylene was carried out using 1 gram of titanium catalyst described above and 1.2 grams of aluminum triethyl in 1 liter of xylene as a diluent. This is an aluminum to titanium ratio of 2 to 1. The temperature of the polymerization was about 150° F. and the pressure atmospheric.

A polyethylene, hereinafter denoted "polyethylene polymer A," having a molecular weight range of 700,000 to 1,300,000, 0.05 methyl group per 100 carbon atoms, and a total unsaturation of .015, was thus prepared.

In a manner similar to that described above, polyethylene polymer B, having a molecular weight range of 300,000 to 500,000 and containing 0.02 wt. percent total unsaturation and 0.06 methyl group per 100 carbon atoms, was prepared. Hydrogen was used during the polymerization as a chain terminating agent.

To illustrate the poor low temperature impact properties of polypropylene, both when unblended and when blended with polyethylenes derived from conventional processes, as compared with the present polyethylene-polypropylene blends, the following examples are set forth.

EXAMPLES 1 THRU 9

As shown in Table II, two types of low pressure isotactic polypropylene were compounded with various types of polyethylene and subjected to tests for impact resistance and Bell brittleness. The molecular weights indicated in Table II are all number average molecular weight values as determined on intrinsic viscosity measurement using Decalin at 135° C. The wt. percent total unsaturation is based on C=C per 100 carbon atoms present in the polymer molecule and is determined by an infrared technique.

The polypropylene and polyethylene were blended in the indicated proportions by the following methods.

In all cases, the desired ratios of the two polymers were admixed by tumble blending from 2 to 4 hours. Blends I and II were then subjected to conventional extrusion, the polymers having been individually screened to less than 375 microns prior to tumble blending and extrusion. All other blends were prepared by solution blending in xylene at 250° to 260° F. after tumble blending.

TABLE II

| Composition | Polypropylene Control A | Polypropylene Control B | Blend I | Blend II |
|---|---|---|---|---|
| I. Polypropylene: | | | | |
| a. Concentration, Wt. Percent | 100 | 100 | 60 | 60 |
| b. Molecular Wt. Range×10⁻³ | 300–550 | 150–250 | 300–400 | 300–400 |
| II. | | | | |
| A. "Preformed Catalyst" Polyethylene: | | | | |
| a. Concentration, Wt. Percent | | | 40 | |
| b. Molecular Wt. Range×10⁻³ | | | 700–1,300 | |
| c. Branching, CH₃/100 C-Atoms | | | <0.05 | |
| d. Total Unsaturation, Wt. Percent | | | ¹ 0.05 | |
| B. "Conventional Ziegler Catalyst" Polyethylene: | | | | |
| a. Concentration, Wt. Percent | | | | 40 |
| b. Molecular Wt. Range×10⁻³ | | | | 700–1,300 |
| c. Branching, CH₃/100 C-Atoms | | | | 0.25 |
| d. Total Unsaturation, Wt. Percent | | | | 0.23 |
| C. High Pressure Polyethylene: | | | | |
| a. Concentration, Wt. Percent | | | | |
| b. Molecular Wt. Range×10⁻³ | | | | |
| c. Branching, CH₃/100 C-Atoms | | | | |
| d. Total Unsaturation, Wt. Percent | | | | |
| PROPERTIES | | | | |
| I. Impact Resistance (Izod, ft. lbs./in. unnotched):² | | | | |
| a. At −40° F | 1–4 | 1–2 | 64 | 10.9 |
| b. At −80° F | 0–2 | 0–2 | 55.3 | 11.3 |
| II. Bell Brittleness Temp., °F.³ | 60–100 | 90–130 | −72 | −13 |

| Composition | Blend III | Blend IV | Blend V | Blend VI | (High pressure) Blend VII |
|---|---|---|---|---|---|
| I. Polypropylene: | | | | | |
| a. Concentration, Wt. Percent | 80 | 80 | 70 | 70 | 60 |
| b. Molecular Wt. Range×10⁻³ | 200–300 | 200–300 | 200–300 | 200–300 | 300–500 |
| II. | | | | | |
| A. "Preformed Catalyst" Polyethylene: | | | | | |
| a. Concentration, Wt. Percent | 20 | | 30 | | |
| b. Molecular Wt. Range×10⁻³ | 700–1,300 | | 300–500 | | |
| c. Branching, CH₃/100 C-Atoms | <0.05 | | <0.05 | | |
| d. Total Unsaturation, Wt. Percent | 0.02 | | ⁴ 0.02 | | |
| B. "Conventional Ziegler Catalyst" Polyethylene: | | | | | |
| a. Concentration, Wt. Percent | | 20 | | 30 | |
| b. Molecular Wt. Range×10⁻³ | | 700–1,300 | | 300–500 | |
| c. Branching, CH₃/100 C-Atoms | | 0.13 | | 0.24 | |
| d. Total Unsaturation, Wt. Percent | | 0.08 | | 0.20 | |
| C. High Pressure Polyethylene: | | | | | |
| a. Concentration, Wt. Percent | | | | | 40 |
| b. Molecular Wt. Range×10⁻³ | | | | | 20–50 |
| c. Branching, CH₃/100 C-Atoms | | | | | 1.43 |
| d. Total Unsaturation, Wt. Percent | | | | | 0.12 |
| PROPERTIES | | | | | |
| I. Impact Resistance (Izod, ft. lbs./in. unnotched):² | | | | | |
| a. At −40° F | 10.7 | 5.1 | >16 | 4.5 | |
| b. At −80° F | 9.1 | 5.3 | >16 | 3.6 | |
| II. Bell Brittleness Temp., °F.³ | 25 | 68 | | | +31 |

¹ Polymer A.
² ASTM Test D-256.
³ ASTM Test D-746.
⁴ Polymer B.

As shown in Table II, unblended polypropylene exhibits very poor low temperature properties. Blends prepared in accordance with the present invention, i.e., Blends I, III, and V show greatly improved low temperature properties, both as compared with unblended polypropylene and polypropylene blended with either conventional low pressure polyethylene or conventional high pressure polyethylene. For example, comparison of Blends I and II illustrate that the present polyethylene polypropylene blends have an impact resistance nearly fivefold better than a blend of polypropylene with the same molecular weight polyethylene prepared by conventional Ziegler catalysts, i.e., simple mixing of titanium tetrachloride and aluminum triethyl in one or more stages. Similarly marked improvement in low temperature properties of polypropylene is exhibited when employing various concentrations and molecular weight of the present polyethylene constituent.

The data in Table II illustrate that polypropylene, when blended with minor quantities of a polyethylene with an extremely low degree of branching and total unsaturation, has markedly better low temperature properties than blends prepared with other types of polyethylene.

The advantages afforded by the present invention readily become apparent. Improvements in the low temperature properties of polypropylene are obtained in an efficient and economical manner. The important properties of polypropylene such as tensile, stiffness, etc., are maintained, while greatly improving the low temperature properties of the polymer.

Various modifications may be made to the present invention. For example, other materials may be incorporated in the blend.

Having described the present invention, that which is sought to be protected is set forth in the following claims.

What is claimed is:

1. A composition of matter of improved low temperature characteristics which comprises: 55 to 90 wt. percent of low pressure, isotactic polypropylene, and 10 to 45 wt. percent of a polyethylene having less than 0.10 methyl group per 100 carbon atoms, a wt. percent unsaturation of less than 0.05.

2. The composition of claim 1 wherein said polyethylene comprises 20 to 40 wt. percent of said composition.

3. The composition of claim 1 wherein said polyethylene contains 0.02 to 0.07 methyl group per 100 carbon atoms, and has a total wt. percent unsaturation of 0.01 to 0.02.

4. A blend of low pressure, isotactic polypropylene and polyethylene wherein said polyethylene comprises 10 to 45 wt. percent of said blend and is characterized as containing 0 to 0.10 methyl group per 100 carbon atoms and has a total unsaturation of 0.005 to 0.05 wt. percent.

5. The composition of claim 4 wherein said polyethylene has a density of 0.95 to 0.96 gram per cubic centimeter measured at 25° C.

6. The composition of claim 4 wherein said polyethylene has a number average molecular weight of 100,000 to 1,800,000.

7. The composition of claim 4 wherein said blend has a Bell brittleness temperature of less than −25° F.

References Cited by the Examiner

UNITED STATES PATENTS

| | | | |
|---|---|---|---|
| 2,791,576 | 5/1957 | Fields et al. | 260—897 |
| 2,882,263 | 4/1959 | Natta et al. | 260—93.7 |
| 2,950,267 | 8/1960 | Thompson et al. | 260—897 |
| 2,956,042 | 10/1960 | Underwood et al. | 260—897 |
| 2,983,704 | 5/1961 | Roedel | 260—897 |

FOREIGN PATENTS 502,597  5/1954  Canada.

MURRAY TILLMAN, *Primary Examiner.*

DAN ARNOLD, LEON J. BERCOVITZ, *Examiners.*

R. N. COE, J. A. KOLASCH, E. B. WOODRUFF,
*Assistant Examiners.*